（12） United States Patent
Hoane, Jr.

(10) Patent No.: US 8,762,641 B2
(45) Date of Patent: Jun. 24, 2014

(54) METHOD FOR ACHIEVING POWER SAVINGS BY DISABLING A VALID ARRAY

(75) Inventor: Arthur Joseph Hoane, Jr., Yonkers, NY (US)

(73) Assignee: Qualcomm Incorporated, San Diego, CA (US)

( * ) Notice: Subject to any disclaimer, the term of this patent is extended or adjusted under 35 U.S.C. 154(b) by 265 days.

(21) Appl. No.: 12/403,021

(22) Filed: Mar. 12, 2009

(65) Prior Publication Data

US 2009/0235032 A1 Sep. 17, 2009

Related U.S. Application Data

(60) Provisional application No. 61/036,181, filed on Mar. 13, 2008.

(51) Int. Cl.
*G06F 12/00* (2006.01)

(52) U.S. Cl.
USPC .......... 711/118; 711/141; 711/E12.017; 711/E12.026; 711/E12.042

(58) Field of Classification Search
USPC .................................... 711/118, 141
See application file for complete search history.

(56) References Cited

U.S. PATENT DOCUMENTS

| | | | |
|---|---|---|---|
| 5,717,895 A * | 2/1998 | Leedom et al. | 711/140 |
| 6,044,441 A * | 3/2000 | Malinowski | 711/144 |
| 6,789,172 B2 * | 9/2004 | Chauvel et al. | 711/144 |
| 6,792,508 B1 * | 9/2004 | Chauvel et al. | 711/128 |
| 6,842,848 B2 | 1/2005 | Hokenek et al. | |
| 6,904,511 B2 | 6/2005 | Hokenek et al. | |
| 6,912,623 B2 | 6/2005 | Hokenek et al. | |
| 6,925,643 B2 | 8/2005 | Hokenek et al. | |
| 6,968,445 B2 | 11/2005 | Hokenek et al. | |
| 6,971,103 B2 | 11/2005 | Hokenek et al. | |
| 6,981,103 B2 | 12/2005 | Nakamura | |
| 6,990,557 B2 | 1/2006 | Hokenek et al. | |
| 7,251,737 B2 | 7/2007 | Weinberger et al. | |
| 7,428,567 B2 | 9/2008 | Schulte et al. | |
| 7,475,222 B2 | 1/2009 | Glossner et al. | |
| 7,593,978 B2 | 9/2009 | Schulte et al. | |
| 7,797,363 B2 | 9/2010 | Hokenek et al. | |
| 8,046,538 B1 * | 10/2011 | Stenstrom | 711/119 |

(Continued)

OTHER PUBLICATIONS

ISR dated May 11, 2009 in PCT/US09/036958.

(Continued)

*Primary Examiner* — Aracelis Ruiz
(74) *Attorney, Agent, or Firm* — Knobbe Martens Olson & Bear LLP

(57) ABSTRACT

A method is described for use when a cache is accessed. Before all valid array entries are validated, a valid array entry is read when a data array entry is accessed. If the valid array entry is a first array value, access to the cache is treated as being invalid and the data array entry is reloaded. If the valid array entry is a second array value, a tag array entry is compared with an address to determine if the data array entry is valid or invalid. A valid control register contains a first control value before all valid array entries are validated and a second control value after all valid array entries are validated. After the second control value is established, reads of the valid array are disabled and the tag array entry is compared with the address to determine if a data array entry is valid or invalid.

19 Claims, 3 Drawing Sheets

(56) References Cited

U.S. PATENT DOCUMENTS

| | | |
|---|---|---|
| 2002/0069332 A1 | 6/2002 | Chauvel et al. |
| 2002/0078268 A1 | 6/2002 | Lasserre |
| 2004/0008552 A1 | 1/2004 | Machimura et al. |
| 2006/0095729 A1 | 5/2006 | Hokenek et al. |
| 2009/0193279 A1 | 7/2009 | Moudgill et al. |
| 2009/0276432 A1 | 11/2009 | Hokenek et al. |
| 2010/0031007 A1 | 2/2010 | Moudgill |
| 2010/0115527 A1 | 5/2010 | Kotlyar et al. |
| 2010/0122068 A1 | 5/2010 | Hokenek et al. |
| 2010/0199073 A1 | 8/2010 | Hokenek et al. |
| 2010/0199075 A1 | 8/2010 | Hokenek et al. |
| 2010/0241834 A1 | 9/2010 | Moudgill |
| 2010/0293210 A1 | 11/2010 | Sima et al. |
| 2010/0299319 A1 | 11/2010 | Parson et al. |

OTHER PUBLICATIONS

IPRR dated Sep. 23, 2010 in PCT/US09/036958.

International Search Report mailed May 11, 2009 in International Patent Application No. PCT/US2009/036958 (1 page).

Written Opinion of the International Search Authority mailed May 11, 2009 in International Patent Application No. PCT/US2009/036958 (5 pages).

Balzola et al., Sep. 26, 2001, Design alternatives for parallel saturating multioperand adders, Proceedings 2001 International Conference on Computer Design, pp. 172-177.

Balzola, Apr. 2003, Saturating arithmetic for digital signal processors, PhD Thesis, Lehigh University.

Glossner et al, 2000, Trends in compilable DSP architecture, IEEE Workshop in Signal Processing Systems, pp. 1-19.

Glossner et al., Apr. 2001, Towards a very high bandwidth wireless battery powered device, IEEE Computer Society Workshop in VLSI, pp. 3-9.

Glossner et al., Nov. 2002, A multithreaded processor architecture for SDR, The Proceedings of the Korean Institute of Communication Sciences, 19(11):70-84.

Glossner et al., Nov. 11-12, 2002, Multi-threaded processor for software-defined radio, Proceedings of the 2002 Software Defined Radio Technical Conference, vol. 1, 6 pp.

Glossner et al., Jan. 2003, A software defined communications baseband design, IEEE Communications Magazine, 41(1):120-128.

Glossner et al., Sep. 22, 23, 2003, Multiple communication protocols for software defined radio, IEEE Colloquium on DSP Enable Radio, ISIL, Livingston, Scotland, pp. 227-236.

Glossner et al., Mar. 4, 2004, 6. The Sandbridge sandblaster communications processor, Software Defined Radio: Baseband Technologies for 3G Handsets and Basestations, John Wiley & Sons, Ltd., pp. 129-159.

Jinturkar et al., Mar. 31-Apr. 3, 2003, Programming the Sandbridge multithreaded processor, Proceedings of the 2003 Global Signal Processing Expo (GSPx) and International Signal Processing Conference (ISPC), Dallas, Tx.

Schulte et al., Nov. 19, 2000, Parallel saturating multioperand adders, Cases '00, pp. 172-179.

Schulte et al., Nov. 2004, A low-power multithreaded processor for baseband communication systems, Lecture Notes in Computer Science, 3133:393-402.

Extended European Search Report dated Aug. 23, 2011 in App. No. 09720931.6.

Glossner et al., Sep. 2004, Sandblaster Low-Power Multithreaded SDR Baseband Processor, Proceedings of the 3rd Workshop on Applications Specific Processors (WASP'04), Stockholm, Sweden, pp. 53-58.

* cited by examiner

METHOD FOR ACHIEVING POWER SAVINGS BY DISABLING A VALID ARRAY

CROSS-REFERENCE TO RELATED APPLICATION(S)

This is a Non-Provisional Patent Application that relies for priority on U.S. Provisional Patent Application Ser. No. 61/036,181, filed on Mar. 13, 2008, the contents of which are incorporated herein by reference.

FIELD OF THE INVENTION

The invention relates to a method for identifying if selected entries in a cache are valid. More specifically, the invention relates to method, using a valid array, to determine if entries in a cache are valid. After all of the entries in the cache are found to be valid, the valid array is disabled.

BACKGROUND OF THE INVENTION

One way of implementing a cache relies upon the use of a separate, valid array. A valid array indicates if specific entries within a cache that are valid. Typically, as is known in the prior art, for each access made to a cache, a read is made of the valid array to determine if the cache entry is valid before accepting the entry in the cache. This means that each time the cache is accessed, a separate read of the valid array is required.

As should be apparent, however, once all of the entries in a cache have been validated (i.e., all of the entries in the cache have been determined to be valid), the valid array no longer serves a purpose. Once each of the entries in the cache is validated, further reads of the valid array do not produce any result other than the already-determined fact that all of the entries are valid. As a result, further reads of the valid array consume power unnecessarily. Any further reads of the valid array are merely duplicative of prior processing steps.

As may be appreciated by those skilled in the art, reading of the valid array after all of the entries in the cache have been validated adds unnecessarily to the power consumed by the processor. This is considered to be wasteful.

As should be appreciated by those skilled in the art, the ability to reduce processor time and power consumption is desirable. Less processor time and lower power consumption contribute to a more efficient processor.

SUMMARY OF THE INVENTION

It is, therefore, one aspect of the invention to improve the efficiency of a processor.

It is a further aspect of the invention to reduce the power consumed by a processor by reducing the number of times that a valid array is accessed after the entries in a cache have been validated.

One specific aspect of the invention, therefore, is implementation of an instruction to disable reads to a valid array after all of the entries in a cache have been validated.

By disabling reads of a valid array after entries in a cache have been validated, the invention reduces the power required by a processor that accesses the cache.

It is an aspect of the invention, therefore, to provide a method and architecture for disabling reads to the valid array under program control.

A further aspect of the invention is to provide a method and a mechanism by which a program first may ensure that all entries are valid, and then disable the valid array.

Other aspects of the invention will become apparent from the discussion provided herein.

BRIEF DESCRIPTION OF THE DRAWINGS

Various aspects of the invention will be described in connection with the drawings incorporated herein, in which.

DESCRIPTION OF EMBODIMENT(S) OF THE INVENTION

Figure 1:
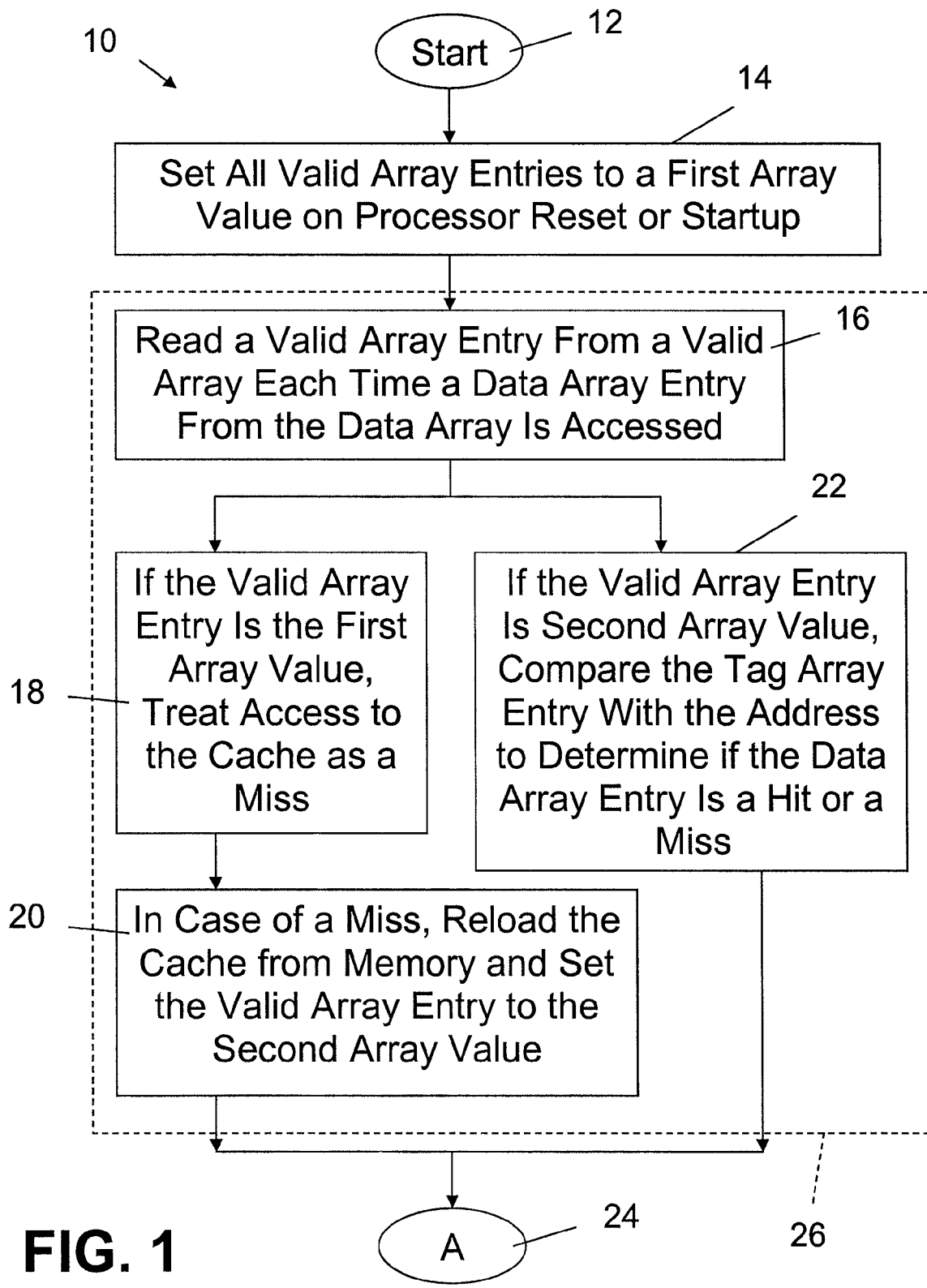
FIG. 1 is a flow diagram illustrating a first part of one embodiment of the method of the invention.

The invention will now be described in connection with one or more embodiments. The embodiment(s) described are not intended to be limiting of the invention. To the contrary, the embodiment(s) are intended to illustrate the broad scope of the invention. As should be appreciated by those skilled in the art, there are numerous variations and equivalents of the embodiments that may be employed. Those variations and equivalents are intended to fall within the scope of the invention.

A cache structure in a processor typically has three (3) components: (1) a tag array, (2) a data array, and (3) a valid array. For purposes of this discussion, the term "processor" is intended to refer broadly to any device capable of executing instructions, whether via software or via hardware. Processors, therefore, encompass computers as a common example. As should be appreciated by those skilled in the art, a processor also may be a handheld device such as a persona data assistant, cellular phone, or the like.

A typical cache may have $2^m$ entries. Each entry may have a size of $2^b$ bytes. While these parameters refer to a typical cache, caches with a greater or a fewer number of entries may be employed without departing from the scope of the invention. Moreover, the invention is not intended to be limited solely to caches where each entry has a size of $2^b$ bytes. The entries may have a larger or a smaller byte sizes without departing from the scope of the invention.

During a cache access, the tag array and the data array are accessed based on bit m+b−1 to bit b of the address. The contents read from the tag-array are compared with the upper bits of the address. For a 32-bit address, this comparison encompasses bit 31 through bit m+b. If the comparison reveals that the contents are identical, the comparison is considered to be successful. In common parlance, this is referred to as a "hit" in the cache. Accordingly, the value read from the data array may be used. Otherwise, if the comparison does not reveal a match, the comparison is not considered to be successful. In this case, it is said that there has been a "miss". As a result, the processor must take further action, which typically includes reloading the cache entry.

As should be apparent to those skilled in the art, and for purposes of the discussion herein, a "hit" refers to finding a valid entry within a cache with a matching tag. A "miss" refers to an entry that is either not valid within the cache or whose tag does not match. Where the entry is not valid, further processing is required, including a reloading of the cache entry, as noted above.

If an entry in a cache is not valid or does not have a matching tag, the cache is reloaded. Reloading an entry involves: (1) reading $2^b$ bytes from the memory location specified by the address, (2) writing that data (i.e., the $2^b$ bytes) into the data array at the location specified by bits m+b−1 to b of the address, and (3) writing the upper bits of the address into the tag array.

A should be appreciated by those skilled in the art, given the tag value for any specific entry, it is possible to determine the memory address to which the entry corresponds. In other words, it is possible to determine the value from a specific memory location that is being stored in the data array. In addition, as should be apparent, for multiple entries, it is possible to determine the values from several memory locations that are being stored in the data array.

When the processor is started, or after it is reset, the tag and data arrays typically hold random values. In particular, the data value of any entry may not match the contents of the memory address determined by the tag value for that entry. This mismatch presents a problem, which is addressed by use of the valid array.

The valid array includes a bit for each entry in the cache. On reset or on processor start-up, all of the bits in the valid array are cleared to 0. If a cache entry is accessed, and the bit in the valid array is 0, access of the cache entry is treated as a "miss". As noted above, the cache entry is then reloaded. After the cache entry is reloaded, the valid bit is set to 1.

Once a valid bit is set to 1, that bit is not set to 0 or reset to 0 until the next reset instruction or start-up instruction is executed. Thus, the valid array provides a useful function only until every cache entry has been reloaded once, if necessary. After each of the cache entries have been reloaded one time, all of the entries in the valid array will be set to 1. Once the valid array reaches this state or condition, any further read of the valid array serves no further use. In other words, once all of the bits in the valid array are set to 1, there is no longer any reason to read the valid array. All subsequent reads will return the same result.

As noted above, in the prior art, it is customary for the valid array to be accessed even after all of the bits in the valid array have been set to 1. As should be apparent, these reads of the valid array consume power needlessly.

The invention avoids needless reading of the bits in the valid array by providing, among other features, a valid control bit. The valid control bit for each cache may be stored in a control register. The program being executed writes to the control register during execution. On startup or after a reset instruction is executed, the valid control bit is set to 0.

When the valid control bit is 0, the program recognizes that all of the entries in the cache have not been validated. As a result, the program operates according to three control parameters. First, the valid array is read for every cache access. Second, if a bit in the valid array is set to 0, the access is treated as a miss. Third, if the bit in the valid array is set to 1, the access is treated as a hit or a miss based on the tag comparison. In other words, before the valid control bit is set to 1, the program operates according to traditional guidelines, at least with respect to the valid array.

When the valid control bit is set to 1, however, the program operates according to a different set of behaviors. First, the valid cache array reads are disabled. Second, the access is treated as a hit or a miss based on the tag comparison.

One possible implementation of the hit or miss logic in pseudo-code of the cache access using the control bit is shown below in Code Segment #1. For purposes of Code Segment #1, it is assumed that the addresses are 32 bits long and that and the cache includes 256 entries of 16 bytes each.

---
Code Segment #1

```
entry = address[11:4];
if( valid_control = 1 )
    valid_bit = 1;
else
    valid_bit = valid_array[entry];
if( address[31:12] == tag_array[entry] )
    tag_hit = 1;
else
    tag_hit = 0;
hit = tag_hit & valid_bit;
```
---

To make use of the valid control bit, the processor must ensure that all the bits in the valid array are 1. The processor may do this by executing a program that touches or examines all of the entries in the cache. For an instruction cache, this involves running a code sequence that executes an instruction from every entry in the cache. For a data cache, this involves running a code sequence that reads a memory location from every entry in the cache. After the program has run either of these code sequences, it may set the valid control bit for the corresponding cache.

In an alternative to the architecture and method described above, it is contemplated that the valid control bit and the valid array entries may operate such that the use of 0s and 1s is reversed. In this alternative approach, the valid control bit initially may be 1. In this instance, once all of the entries are validated, the valid control bit may be set to 0. For the valid array, all of the entries may be initialized to zero. In this case, once an entry is validated, the entry may be changed to 0. Other variations are also contemplated to fall within the scope of the invention.

Set Associative Caches

Set associative caches present additional challenges with respect to the method of the invention.

A set associative cache may be treated quite similarly to the direct mapped cache described above. In an N-way set associative cache, there are N sets of data arrays with tag arrays and valid bits for each entry. Typically, all of these arrays are accessed in parallel, and each of the N tag values are compared with upper bits of the address. The N valid bits are used to determine if the corresponding entry is valid. Generally, at most one of the valid tag comparisons is expected to succeed in this scenario. If so, it is treated as a hit and the data array value corresponding to the matching tag is used. Otherwise, the cache access is a miss, and the address is reloaded into the cache. One set of tag arrays or data arrays for that entry is selected and the reloaded address or data is written to that set.

For our solution to be applicable to a set associative cache, it is desirable to establish a sequence that guarantees that all entries in the cache have been reloaded. Knowledge of the replacement policy (i.e., when reloading, which set will the reload go into) is key to generating such a sequence. For instance, if the reload policy is completely random, there is no sequence that guarantees that all sets in all entries will be accessed, and thereby set to a valid condition or state.

For a common replacement policy, known as LRU (least recently used), the sequence for setting all bits to a valid condition is straight forward. For a N-way set associative cache, the program accesses N addresses corresponding to each entry.

Flush

Some processors support a cache flush instruction, which invalidates a cache entry. If this instruction is implemented by means of clearing the valid bit for that cache entry, the program additionally ensures that the valid-control bit is set to 0.

It may then run an additional code sequence to ensure that the invalidated bit is reset to 1, and then set the valid-control bit back to 0.

Hardware Controlled

While the focus of this discussion has been on the concept of using a software based valid control bit, the same results may be achieved using hardware. As should be appreciated by those skilled in the art in view of the foregoing discussion, hardware may be designed where the valid control array ANDs all of its bits together. If the result of the AND operation is 1, then all bits in the array are 1, and it is no longer necessary to access the array. As may be appreciated by those skilled in the art, an OR operand may be used in the place of the AND operand without departing from the scope of the invention.

Figure 2:
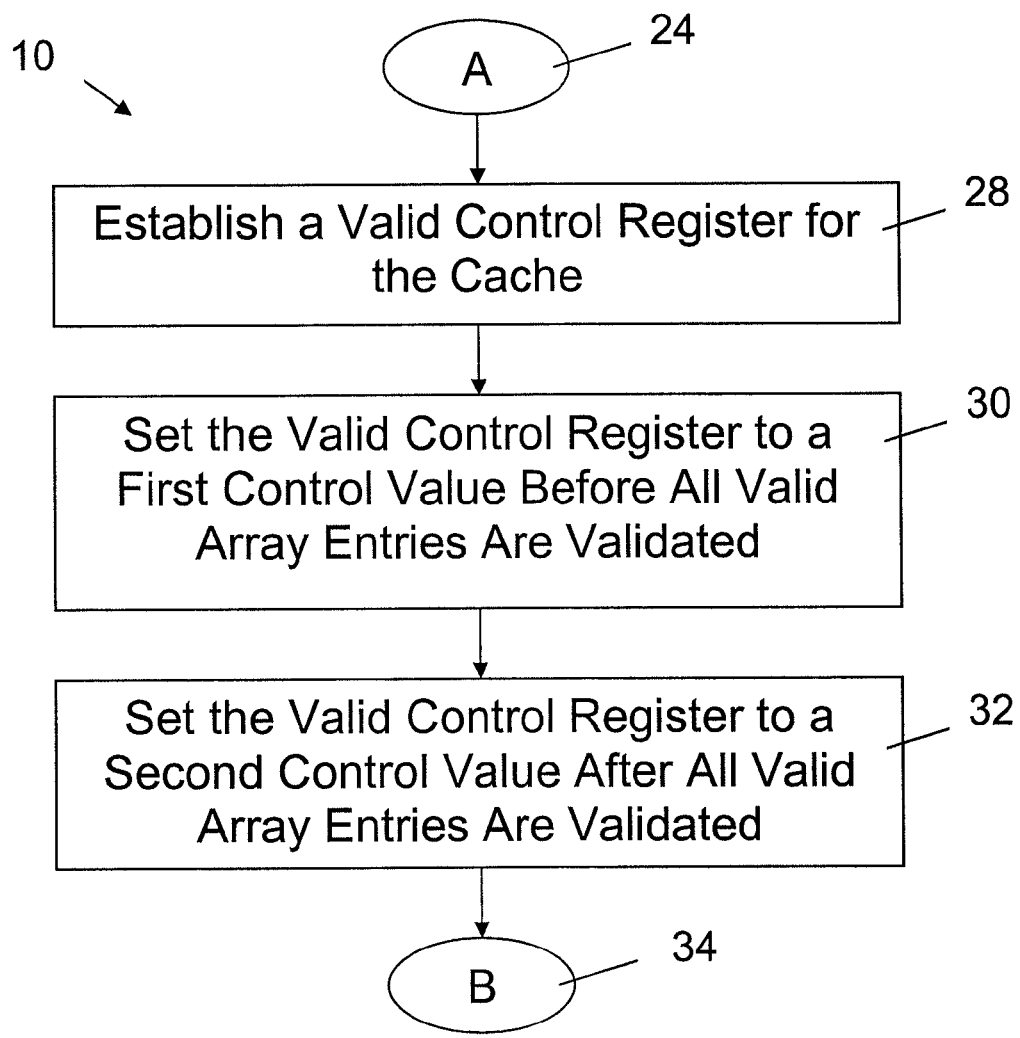
FIG. 2 is a continuation of the flow diagram illustrated in FIG. 1, providing a second part of one embodiment of the method of the invention.
Figure 3:
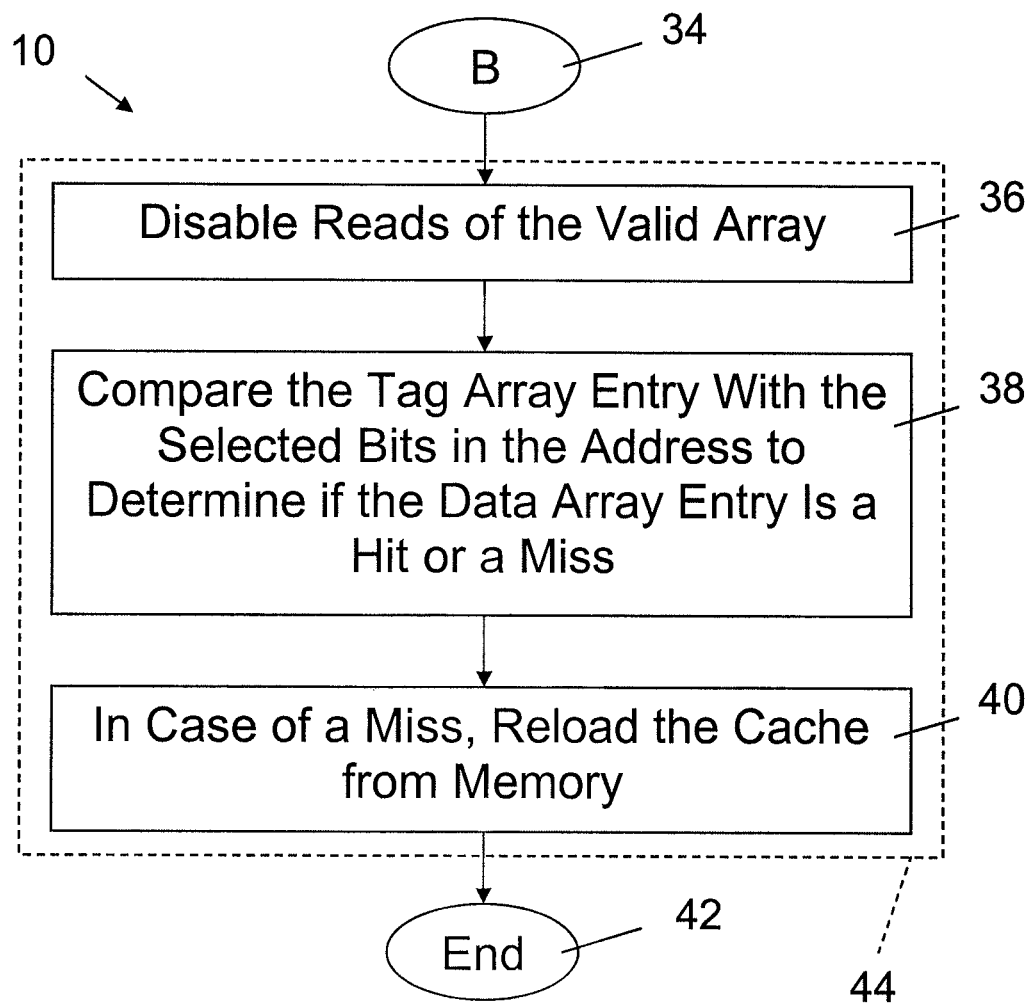
FIG. 3 is a continuation of the flow diagram illustrated in FIG. 2, providing a third part of one embodiment of the method of the invention.

Reference is now made to FIGS. 1-3 of the drawings. FIGS. 1-3 illustrate one embodiment of the invention.

With reference to FIG. 1, the method 10 begins at 12. The method 10 is intended to be executed by a processor for accessing a cache. As noted above, a cache includes a tag array, a data array, and a valid array. At 14, the method 10 sets all valid array entries in the valid array to a first array value on processor reset or startup. The method 10 proceeds to 16, where it reads a valid array entry from the valid array each time a data array entry from the data array is accessed. After 16, the method 10 selects between two separate paths. At 18, if the valid array entry is a first array value, access to the cache is treated as a miss, which indicates that the entry is invalid. If so, at 20, the cache is reloaded from memory and the valid array entry is set to the second array value. Following the other path, at 22, if the valid array entry is a second array value, a tag array entry in the tag array is compared with selected bits in an address to determine if the data array entry is a hit or a miss. A hit indicates a valid entry while a miss indicates an invalid entry. In FIG. 1, a transition block 24, also labeled "A", is provided to indicate that the method 10 continues in FIG. 2.

In FIG. 1, the dotted border 26 that encompasses 16, 18, 20, and 22 is intended to convey that these four operations are performed during an interval before all of the entries in the valid array have been validated.

With reference to FIG. 2, the method 10 proceeds to 28 where a valid control register is established for the cache. At 30, the valid control register is set to a first control value before all valid array entries are validated. At 32, the valid control register is set to a second control value after all valid array entries are validated. A second transition block 34, also labeled "B", indicates that the method 10 continues in FIG. 3.

With reference to FIG. 3, the method 10 continues at 36 where, after the second control value is set, reads of the valid array are disabled. At 38, after reads of the valid array are disabled, the tag array entry is compared with the selected bits in the address to determine if the data array entry is a hit or a miss. In the case of a miss, the cache is reloaded from memory at 40. The method ends at 42. The dotted border 44 is intended to indicate that the operations 36, 38, and 40 are executed during an interval after all of the valid array entries have been validated.

As noted above, in one contemplated variation of the method 10, the data array may comprise $2^m$ entries, each of the data array entries may comprise $2^b$ bytes, and there may be a total number of addresses, $2^a$. Of course the data array and the entries also may be of a larger or smaller size without departing from the scope of the invention.

In a variation of the method 10, the tag array is compared with upper bits in the address. Alternatively, where $2^m$ entries with $2^b$ bytes are used, it is contemplated that the tag array entry is compared with bits a−1 to m+b of the address. If the address is a 32-bit address, the tag array is compared with bits 31 to m+b in the address.

With respect to reloading of the data entries, reloading is contemplated to involve several operations. First, $2^b$ bytes are read from a memory location specified by the address. Second, the $2^b$ bytes are written to a data array entry specified by bits m+b−1 to b of the address. Third, upper bits, a to m+b, from the address are written to the corresponding tag array entry. Other contemplated reload operations also are contemplated to fall within the scope of the invention.

With respect to the valid control register, it is contemplated that the register is a one bit register. Similarly, it is contemplated that all of the valid array entries are single bit entries.

For purposes of the invention, the cache may be a data cache, or it may be an instruction cache. The cache also may be a set associative cache with N sets of data arrays. If so, each of the N sets of data arrays may be accessed in parallel.

With respect to the method 10, if, after the valid array entry has been set to the second array value, the data array entry subsequently becomes invalid, the method 10 contemplates resetting the valid array entry to the first array value. As should be appreciated from the foregoing, if the valid control register contains the second control value, the valid control register is reset to contain the first control value.

In a variation contemplated for the method 10, the second control value is established by combining all of the valid array entries.

As may be appreciated from the discussion above, the method 10 contemplates that the all of the valid array entries are combined via hardware. Where hardware is employed, all of the valid array entries may be combined via an AND operand or an OR operand. Where an AND operand is employed, the first array value is 0, the second array value is 1, the first control value is 0 and the second control value is 1. Where an OR operand is used, the first array value is 1, the second array value is 0, the first control value is 1 and the second control value is 0.

In another contemplated variation of the method, the second control value is established in response to an instruction executed by the processor.

The method 10 also may include a validation forcing operation. A validation forcing operation forces validation of the valid array. A validation forcing instruction includes reading a predetermined sequence of addresses, setting all of the valid array entries to the second array value, and setting the valid control register to the second control value. In a variation of the validation forcing operation, instructions may be executed in a predetermined sequence of addresses, thereby setting all valid array entries to the second array value. Then, the valid control register may be set to the second control value.

Other embodiments and variations of the invention, whether via a method or via hardware, should be apparent to those skilled in the art based on the embodiments described above. Those variations and equivalents are intended to fall within the scope of the invention.

What is claimed is:

1. A method executed by a processor for accessing a cache, wherein the cache comprises a tag array, a data array and a valid array, the method comprising:

setting all entries in the valid array to a first array value;
  before all valid array entries are validated,
    reading a valid array entry from the valid array each time a data array entry from the data array is accessed,
    if the valid array entry is the first array value, treating access to the cache as a miss, if the valid array entry is a second array value, comparing a tag array entry in the tag array with selected bits in an address to determine if the data array entry is a hit or a miss, and in case of a miss, reloading the cache from memory, and setting the valid array entry to the second array value;

establishing a valid control register for the cache, the valid control register indicating whether all valid array entries are validated;

setting the valid control register to a first control value before all valid array entries are validated;

monitoring the valid array entries on an entry-by-entry basis while the processor is executing a program and setting the valid control register to a second control value when it is determined that all valid array entries are validated;

after the second control value is set, accessing cached data in the data array without reading the valid array at least by comparing the tag array entry with the selected bits in the address to determine if the data array entry is a hit or a miss, and in case of a miss, reloading the cache from memory, if, after the valid array entry has been set to the second array value, the data array entry subsequently becomes invalid, resetting the valid array entry to the first array value; and if the valid control register contains the second control value, resetting the valid control register to contain the first control value.

2. The method of claim 1, wherein the data array comprises $2^m$ entries, each of the data array entries comprise $2^b$ bytes, and the total number of addresses is $2^a$, where m is an integer, a is an integer and b is an integer.

3. The method of claim 2, wherein the tag array entry is compared with bits a−1 to m+b of the address.

4. The method of claim 3, wherein:
the address is a 32 bit address, and
the tag array is compared with bits 31 to m+b in the address.

5. The method of claim 1, wherein the valid control register comprises one bit.

6. The method of claim 1, wherein all of the valid array entries comprise one bit.

7. The method of claim 1, wherein the tag array is compared with upper bits in the address.

8. The method of claim 1, wherein the reloading comprises:
reading $2^b$ bytes from a memory location specified by the address;
writing the $2^b$ bytes to a data array entry specified by bits m+b−1 to b of the address; and
writing upper bits a to m+b from the address to the corresponding tag array entry, wherein a, b and m are all integers.

9. The method of claim 1, wherein the cache is a data cache.

10. The method of claim 1, wherein the cache is an instruction cache and the data array comprises instructions.

11. The method of claim 1, wherein the cache is a set associative cache with N sets of data arrays, with N being an integer, and wherein each of the N sets of data arrays are accessed in parallel.

12. The method of claim 1, wherein the second control value is established by combining all of the valid array entries.

13. The method of claim 1, wherein the second control value is established in response to an instruction executed by the processor.

14. The method of claim 13, further comprising:
executing a validation forcing instruction comprising
reading a predetermined sequence of addresses,
setting all of the valid array entries to the second array value, and
setting the valid control register to the second control value.

15. The method of claim 13, further comprising:
executing a validation forcing instruction comprising
executing instructions in a predetermined sequence of addresses, thereby setting all valid array entries to the second array value, and
setting the valid control register to the second control value.

16. The method of claim 1, wherein the process of setting all entries in the valid array to a first array value is performed on processor reset or startup.

17. A non-transitory storage medium having instructions stored therein which, when executed by a processor, performs a method for accessing a cache, wherein the cache comprises a tag array, a data array and a valid array, the method comprising:

setting all entries in the valid array to a first array value;
before all valid array entries are validated,
reading a valid array entry from the valid array each time a data array entry from the data array is accessed,
if the valid array entry is the first array value, treating access to the cache as a miss,
if the valid array entry is a second array value, comparing a tag array entry in the tag array with selected bits in an address to determine if the data array entry is a hit or a miss, and
in case of a miss, reloading the cache from memory, and setting the valid array entry to the second array value;
establishing a valid control register for the cache, the valid control register indicating whether all valid array entries are validated;
setting the valid control register to a first control value before all valid array entries are validated;
monitoring the valid array entries while the processor is executing a program and setting the valid control register to a second control value when it is determined that all valid array entries are validated;
after the second control value is set,
accessing cached data in the data array without reading the valid array at least by
comparing the tag array entry with the selected bits in the address to determine if the data array entry is a hit or a miss, and
in case of a miss, reloading the cache from memory,
if, after the valid array entry has been set to the second array value, the data array entry subsequently becomes invalid,
resetting the valid array entry to the first array value; and
if the valid control register contains the second control value, resetting the valid control register to contain the first control value.

18. A device for accessing a cache, wherein the cache comprises a tag array, a data array and a valid array, the device comprising:
means for setting all entries in the valid array to a first array;
means for, before all valid array entries are validated,
reading a valid array entry from the valid array each time a data array entry from the data array is accessed,
if the valid array entry is the first array value, treating access to the cache as a miss, if the valid array entry is a second array value, comparing a tag array entry in the tag array with selected bits in an address to determine if the data array entry is a hit or a miss, and
in case of a miss, reloading the cache from memory, and setting the valid array entry to the second array value;
means for establishing a valid control register for the cache, the valid control register indicating whether all valid array entries are validated;
means for setting the valid control register to a first control value before all valid array entries are validated;
means for monitoring the valid array entries while the processor is executing a program and setting the valid control register to a second control value when it is determined that all valid array entries are validated;
means for, after the second control value is set,
   accessing cached data in the data array without reading the valid array at least by
   comparing the tag array entry with the selected bits in the address to determine if the data array entry is a hit or a miss, and
   in case of a miss, reloading the cache from memory,
means for, if, after the valid array entry has been set to the second array value, the data array entry subsequently becomes invalid,
   resetting the valid array entry to the first array value; and
   if the valid control register contains the second control value, resetting the valid control register to contain the first control value.

19. A device for accessing a cache, wherein the cache comprises a tag array, a data array and a valid array, the device comprising a processor configured to:
   set all entries in the valid array to a first array value;
   before all valid array entries are validated,
      read a valid array entry from the valid array each time a data array entry from the data array is accessed,
      if the valid array entry is the first array value, treat access to the cache as a miss,
      if the valid array entry is a second array value, compare a tag array entry in the tag array with selected bits in an address to determine if the data array entry is a hit or a miss, and
      in case of a miss, reload the cache from memory, and setting the valid array entry to the second array value;
   establish a valid control register for the cache, the valid control register indicating whether all valid array entries are validated;
   set the valid control register to a first control value before all valid array entries are validated;
   monitor the valid array entries while the processor is executing a program and set the valid control register to a second control value when it is determined that all valid array entries are validated;
   after the second control value is set,
      accessing cached data in the data array at least by
      compare the tag array entry with the selected bits in the address to determine if the data array entry is a hit or a miss, and
      in case of a miss, reload the cache from memory,
   if, after the valid array entry has been set to the second array value, the data array entry subsequently becomes invalid,
      reset the valid array entry to the first array value; and
      if the valid control register contains the second control value, reset the valid control register to contain the first control value.

* * * * *